United States Patent [19]

Locke

[11] Patent Number: 5,782,090
[45] Date of Patent: Jul. 21, 1998

[54] HOSE CLIP

[75] Inventor: Thomas M. B. Locke, Mishawaka, Ind.

[73] Assignee: Excel Industries, Inc., Elkhart, Ind.

[21] Appl. No.: 757,781

[22] Filed: Nov. 27, 1996

[51] Int. Cl.⁶ ................................................. F16D 31/02
[52] U.S. Cl. ........................... 60/397; 248/71; 248/74.2; 24/16 R; 24/20 R
[58] Field of Search ............................... 60/397; 24/16 R, 24/20 R, 346, 339, 205, 16 PB; 248/71, 74.2, 74.1, 74.3

[56] References Cited

U.S. PATENT DOCUMENTS

| | | | |
|---|---|---|---|
| 3,429,985 | 2/1969 | Czigler | 24/160 B |
| 3,565,375 | 2/1971 | Babb | 248/74.3 |
| 3,829,077 | 8/1974 | Strybel . | |
| 4,128,918 | 12/1978 | Wenk | 24/16 R |
| 4,372,011 | 2/1983 | Aranyos | 24/16 PB |
| 4,439,896 | 4/1984 | Matsui | 24/16 PB |
| 4,447,934 | 5/1984 | Anscher | 24/16 PB |
| 4,516,293 | 5/1985 | Beran . | |
| 4,840,345 | 6/1989 | Neil et al. | 248/71 |
| 5,271,588 | 12/1993 | Doyle . | |
| 5,367,750 | 11/1994 | Ward | 248/74.3 |

Primary Examiner—F. Daniel Lopez
Attorney, Agent, or Firm—Banner & Witcoff Ltd

[57] ABSTRACT

One or more hose clips may advantageously be used to rout and releasably secure a hose assembly such as those included in a vacuum manifold assembly, to a fixed structure of a motor vehicle. The hose clip has a main body which is circumferentially open-sided, partially defining a hose-receiving space which has an inside, free stat cross-sectional dimension and attachment means extending from the main body for attachment into an opening in the firewall of the motor vehicle. The attachment means may preferably be a christmas tree stem. The main body of the hose clip has an opening sized to receive hoses of varying diameters. On one side of the main body of the opening is a flange and on the other side of the main body is a tab. Extending from the flange is a hook with serrations which engage corresponding serrations on the tab to close the opening and retain the hose. The clip may preferably have a pair of hooks, each angled with the flange so as to lockingly secure hoses of different diameters. A living hinge may preferably be positioned between the main body and the flange. Pressure of the hose on the interior of the clip urges the flange and the tab to bend towards one another, allowing the hook and the tab to be connected together with a simple tool. The tool can be used to open the clip if the hose needs to be serviced.

28 Claims, 3 Drawing Sheets

HOSE CLIP

FIELD OF THE INVENTION

The present invention generally relates to clips securing one part to another, and more particularly to hose clips suitable for use on vacuum manifold assemblies securing hoses to motor vehicles.

BACKGROUND OF THE INVENTION

Vacuum manifold assemblies are used in some motor vehicles to supply a pressure differential to a brake booster assembly or to other subassemblies. The vacuum manifold assembly typically comprises a hose assembly having a series of hoses connecting the engine, brake booster and an air inlet source. An aspirator is commonly used, maintaining and boosting air pressure as it is needed. An example of an aspirator used in vacuum manifold assemblies is disclosed in commonly owned U.S. Pat. No. 5,291,916 to Kloosterman et al.

If the hoses get too close to a heat source the hose could leak or otherwise be damaged. Since the vacuum manifold assembly is typically positioned near the engine, it is important to rout the hoses correctly to avoid excessive heat. Current production designs use simple christmas tree stems which are taped to the hoses. This is a laborious process that requires an operator to wrap tape around each side of the clip. Then the ribbed or flanged christmas tree stems are pushed into openings in the firewall or other suitable mounting location in the motor vehicle. Correct location of the openings allows for proper routing of the hoses so as to avoid interfering with other components in increasingly crowded engine compartments in a motor vehicle.

Christmas tree stems are designed to be inserted into an opening in one direction and to resist exiting the opening in the opposite direction. Occasionally the hose assembly will need to be serviced. A problem with existing designs is that the christmas tree stems needs to be wrenched out of the firewall openings in order to free the associated hose of the vacuum manifold assemblies. Typically the christmas tree stem cannot be reused. It would be desirable to simplify the procedure required for installation and removal of vacuum manifold assemblies in motor vehicles, and to be able to reuse the same clip when the hose needs to be temporarily removed or replaced.

In view of the foregoing, it is an object of the present invention to provide a clip of simple design which can secure a hose.

It is an object of the present invention to provide a releasable clip of low cost suitable for use to rout a hose of a vacuum manifold assembly in a motor vehicle.

It is an object of at least certain preferred embodiments of the present invention to provide a clip that can receive and secure a hose having any one of multiple diameters.

It is another related object of the present invention to provide a hose assembly having a reusable clip which releasably secures a hose.

It is another related object of the present invention to provide a clip for a vacuum manifold assembly that allows for relatively simple installation and easy removal should the vacuum manifold assembly need to be serviced.

SUMMARY

In accordance with these and other objects, there is provided a hose clip for a hose assembly having interior and exterior surfaces. A flexible, generally tubular main body is circumferentially open-sided to partially define a generally circular hose-receiving space having an inside, free state cross-sectional dimension. Extending from one side of the main body of the hose clip is a flange, and extending from the other side of the main body of the hose clip is a tab. A first hook is positioned near a distal end of the flange. A living hinge is preferably positioned between the main body and the flange so that flange can bend, allowing the first hook to be lockingly engageable with the tab. In accordance with a highly advantageous feature, the pressure of a hose on the interior surface of the hose clip urges the flange to bend so that the hook is lockingly engageable with the tab. In certain preferred embodiments it is difficult to hold the hose clip in a closed position unless a hose is retained inside the hose clip.

Preferably the first hook and the tab have teeth or serrations which lock with one another when the hose clip is in a closed position. Pressure from the hose on the interior surface of the hose clip urges the tab towards the first hook and urges the first hook towards the tab, advantageously locking the serrations together and securing the hose within the hose clip. An interior surface of the main body of the hose clip may preferably have at least one rib which resists rotational motion of the hose relative the hose clip. A christmas tree stem or other suitable connector may extend from the main body of the clip for attaching the clip to a fixed structure, such as a firewall in a motor vehicle.

Installation of a hose assembly or a vacuum manifold assembly into a motor vehicle is greatly simplified with this invention. A hose is inserted through the opening into the clip and the flange is bent relative the main body so that the first hook is lockingly engaged with the tab. A rib stop may be positioned near or on the tab. The rib stop acts as a catch for a simple tool, such as modified pair of pliers with narrow ends. The two ends of the pliers contact corresponding sides of the hose clip, with one end contacting the flange, and the other contacting the tab and prevented from sliding off by the rib stop. When pressure is applied, the tab moves past the first hook. The rib stop allows the tool to guide the tab into locking engagement with the hook. That is, the serrations of the hook are lockingly engaged with the serrations of the tab, as the tab and the hook are pushed against one another. To service the hose, the process may be reversed. Pressure from the tool moves the tab out of engagement with the hook, additional pressure moves the tab towards the hose such that the tab clears the hose when the tab is allowed to move to a free state or an open condition. In this way the hose clip can be moved to the open condition allowing the hose to be removed from the hose clip. Advantageously, the hose clip does not need to be removed from the firewall of the motor vehicle. Moreover, the hose clip can be reused with a new hose assembly or new vacuum manifold assembly.

From the foregoing disclosure and the following more detailed description of various preferred embodiments it will be apparent to those skilled in the art that the present invention provides a significant advance in the technology and art of clips for hoses, and particularly for hose clips used to secure vacuum manifold assemblies. Particularly significant in this regard is the potential the invention affords for a low cost design that allows relatively simple assembly and disassembly of vacuum manifold assembly componentry. Additional features and advantages of various preferred embodiments will be better understood in view of the detailed description provided below.

Figure 1:
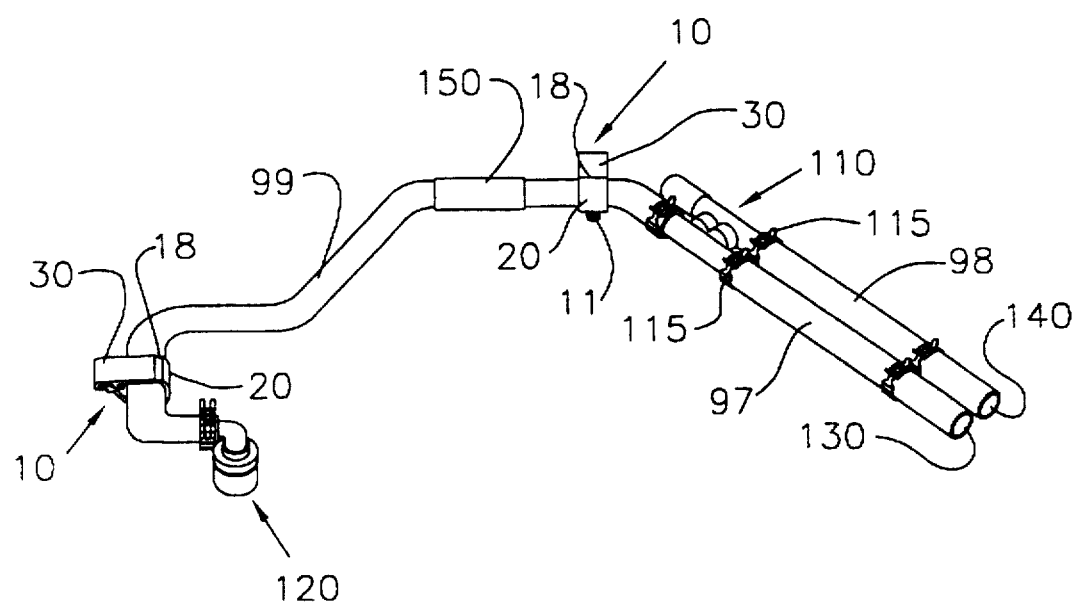
FIG. 1 is a perspective view of a vacuum manifold assembly using a pair of clips to mount and rout the hosing in accordance with a preferred embodiment.

It should be understood that the appended drawings are not necessarily to scale, presenting a somewhat simplified representation of various preferred features illustrative of the basic principles of the invention. The specific design features of a clip as disclosed here, including, for example, the angle each hook makes with the flange, will be determined in part by the particular intended application and use environment. Certain features of the illustrated embodiments have been enlarged or distorted relative to others to facilitate visualization and clear understanding. In particular, thin features may be thickened, and the dimensions of various components may be modified for clarity of illustration. All references to direction and position, unless otherwise indicated, refer to the orientation of the hose clip illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for hose clips disclosed herein. The following detailed discussion of various alternative and preferred features and embodiments will illustrate the general principles of the invention with reference principally to a hose clip mounting and routing a vacuum manifold assembly for use in a motor vehicle. Other embodiments suitable for other applications will be apparent to those skilled in the art given the benefit of this disclosure.

Turning now to the preferred embodiments shown in the drawings, FIG. 1 shows a vacuum manifold assembly having a hose assembly comprising a hose 98 connecting an aspirator 110 with a brake booster at 140, a second hose 99 connecting an engine port 120 with an aspirator 110, and a hose 97 connecting the aspirator with an air inlet source at 130. Vacuum is drawn into the second hose 99 from the engine through port 120. An aspirator 110 regulates the relative pressures between the brake booster and the engine to ensure proper operation and increase response times of the brakes or other vacuum regulated componentry. Spring clamps 115 secure the hoses to the various components, for example, the second hose 99 to aspirator 110. Heat shield 150 may be used where the hoses 97,98,99 are positioned near hot elements of the motor vehicle.

Figure 2:
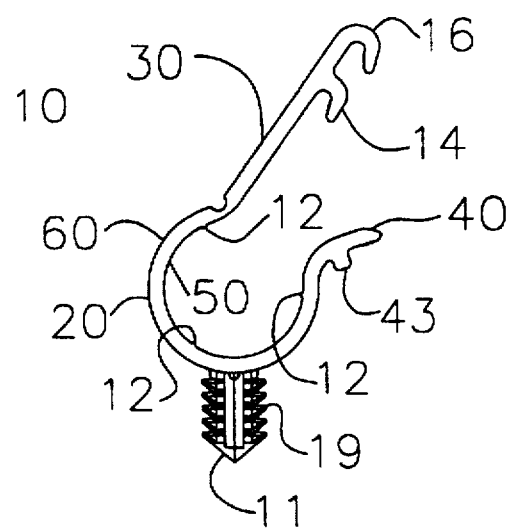
FIG. 2 is a side view of a preferred embodiment of the clip in an open position showing a pair of hooks.
Figure 3:
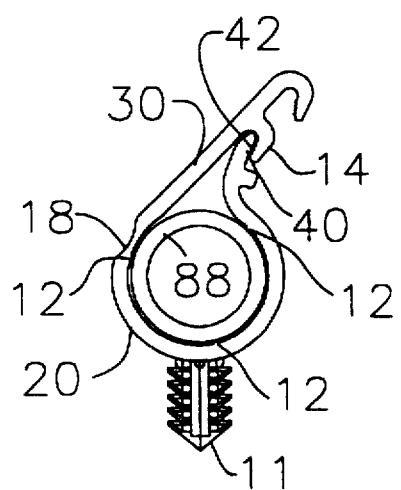
FIG. 3 is a side view showing the clip in a closed position around a first hose having a first diameter.
Figure 4:
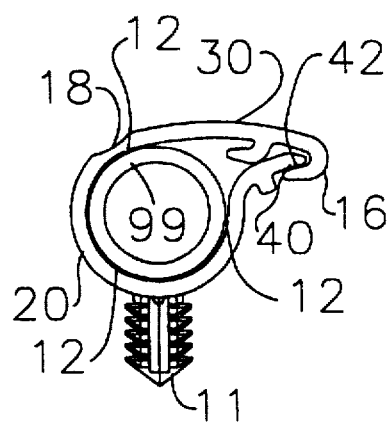
FIG. 4 is a side view showing the clip in a closed position around a second hose having a second diameter which is larger than the first diameter.

In FIG. 1 the vacuum manifold assembly is secured by pair of hose clips 10 mounted on hose 99 which would preferably be mounted to the firewall of a motor vehicle (not shown). Alternate mounting locations and an alternative number of hose clips may be used within the scope of this invention, depending on the location and design of under the hood motor vehicle componentry. FIG. 2 shows a preferred embodiment of hose clip 10 having a flexible main body 20 which is circumferentially open-sided to define a hose receiving space. One side of the main body of the hose clip 10 has a flange 30 and the other side of the main body of the clip has a tab 40. FIG. 2 also shows the clip in an open position or free state, and has an inside, free state cross-sectional dimension, which is defined as the distance between the side of the main body with the tab and the side of the main body with the flange. As shown in FIG. 4 the clip is movable to a first closed position having a first closed position cross-sectional dimension. FIG. 3 shows a second closed position having a second closed position cross-section smaller than the first closed position cross section dimension.

Preferably the clip is made of a engineering plastic such as nylon, for example Zytel (408) manufactured by E.I. Dupont de Nemours. The clip has an interior surface 50 and an exterior surface 60. Mounted on the exterior surface is an attachment assembly such as a christmas tree stem 11 which is insertable into a hole in a motor vehicle firewall or other suitable opening in a fixed structure. The christmas tree stem 11 has axially spaced flexible projections 19 that flex in one direction into the hole, but then expand and prevent removal from the hole in the opposite direction.

Figure 5:
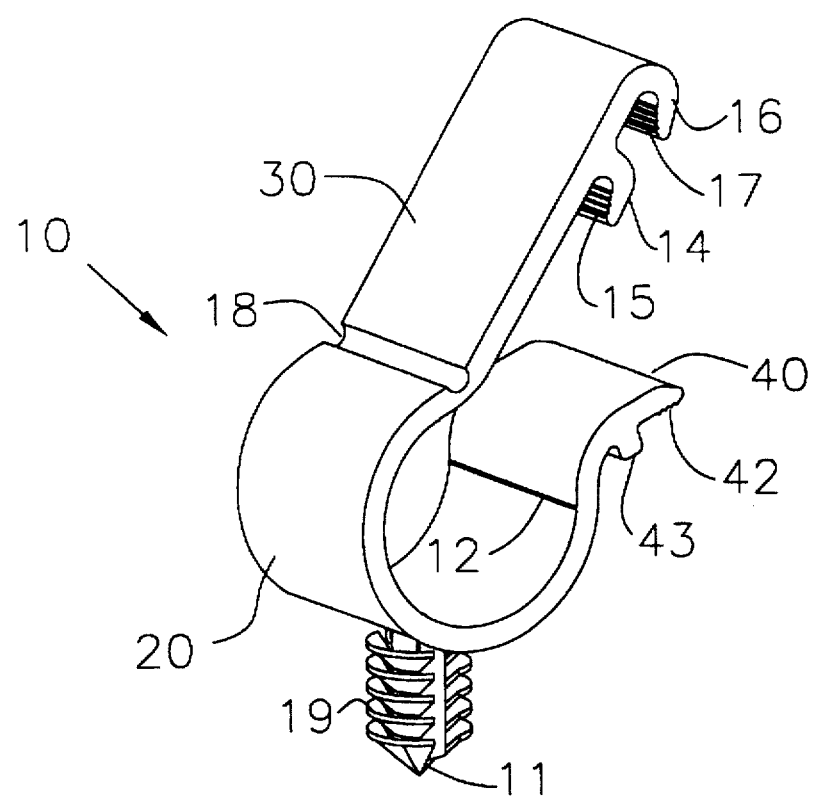
FIG. 5 is a perspective view of the clip.

At least one and preferably three ribs 12, as best shown in FIG. 5, engage a hose to resisting motion of the hose relative the clip, such as rotary or sliding motion. As shown in FIGS. 3 and 4, the tab 40 and the flange 30 interlock to secure a hose inside the clip. In a highly advantageous feature of at least certain preferred embodiments, a living hinge 18 is positioned between the main body 20 and the flange 30, allowing greater flexibility of the flange vis-a-vis the main body 20.

Extending from a distal end of the flange is a first hook 16 lockingly engageable with the distal end of tab 40 to secure a hose 99 having a first diameter inside the clip (FIG. 4). When the hose 99 is positioned inside the clip, pressure is exerted on the interior surface 50 of the clip urging the clip to bend such that the first hook 16 is lockingly engaged with the distal end of tab 40. The tab and the first hook may be pushed together manually or through the use of a tool, such as a pair of pliers, preferably with arms modified to grab at a laterally extending, outwardly projecting rib stop 43, discussed in more detail below.

Preferably the first hook 16 and the tab 40 each have at least three and most preferably four teeth or serrations 17,42, respectively which lockingly engage one another when the clip is in the first closed condition. Advantageously, the pressure from the hose 88 urges the tab towards the first hook, and urges the first hook towards the tab. The tab serrations 42 grab or bite into the first hook serrations 17 to lockingly engage one another in the first closed condition. In certain preferred embodiments the clip 10 can releasably secure hoses having one of multiple diameters. In FIG. 3, a second hook 14 is positioned on the flange. This second hook also preferably has serrations 15. The serrations 15 are lockingly engageable with the tab serrations 42 in the second closed condition. A second hose 88, having a diameter smaller than the diameter of hose 99, can be inserted through the opening into the clip. Pressure from the second hose 88 on the interior surface of the clip makes the second hook 14 bend into locking engagement with the tab 40 at the second closed position in much the same manner as the first hook is lockingly engageable with the tab at the first closed position.

In the preferred embodiments shown in FIGS. 3 and 4, the hose clip can receive hoses within wide tolerances of those having diameters which are common sizes for hoses used in the automotive industry, such as hoses with internal diameters of 15/32 of an inch and 11/32 of an inch. To captivate hoses of these diameters, the angle between the first hook and the flange is in the range of 34 to 38 degrees, most preferably 36.4 degrees, and the angle between the second hook and the flange is in the range of 20 to 24 degrees, most preferably 21.4 degrees. Of course, the angle of the hook can be modified to receive hoses of varying alternate sizes in accordance with techniques known to those skilled in the art. Those skilled in the art will note that the larger the diameter of the hose the more pressure the hose places on the clip and the tighter the clip will lock.

The clip shown in the drawings is releasable, that is, once the clip is snapped into place and the serrations of the hook and tab lockingly engage one another, the serrations can be disengaged and the hose removed from the clip. A releasable hose clip might be desired for service where the hose has been damaged and needs to be replaced. Such disengagement is now a simple operation. A pair of pliers with modified narrow ends or legs grabs the clip. One leg contacts the flange, the other contacts the tab and is prevented from sliding off by the rib stop 43. When pressure is applied, the tab serrations 42 move out of engagement with either hook serrations 15 or 17. Additional pressure inwards moves the edge of the tab 40 out of engagement with the edge of whichever hook (14 or 16) was used to secure the hose. In this way the clip can be moved to the open condition and the hose can be serviced. Advantageously, the clip does not need to be removed from the firewall of the motor vehicle. Moreover, the clip can be reused with new hose assembly or new vacuum manifold assembly.

From the foregoing disclosure and detailed description of certain preferred embodiments, it will be readily apparent to those skilled in the art that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A hose clip comprising, in combination:
   a flexible, generally tubular, open-ended main body which is circumferentially open-sided to partially define a hose-receiving space having an inside, free state cross-sectional dimension;
   a flange extending from one side of the main body and having a first hook with first hook serrations;
   a tab extending from a second side of a main body having a distal end with tab serrations;
   a living hinge connecting the main body to the flange, permitting the flange to bend toward the tab to reduce the inside cross sectional dimension of the hose-receiving space in a first closed condition;
   wherein the first hook is lockingly engageable with the distal end of the tab to close the hose receiving space, the first hook serrations being engageable with the tab serrations to enhance locking engagement of the first hook with the tab; and
   an attachment means for securing the hose clip to a fixed structure.

2. The hose clip of claim 1 wherein the attachment means comprises a christmas tree stem having a series of axially spaced flexible projections.

3. The hose clip of claim 1 wherein the main body has at least one rib extending into the hose-receiving space to resist rotation of a hose seated in the hose-receiving space of the hose clip in the closed condition.

4. The hose clip of claim 1 wherein the flange is releasably lockingly engageable to the tab.

5. The hose clip of claim 1 wherein the first hook is at a distal end of the flange and forms an angle with the flange in the range of 34 to 38 degrees.

6. The hose clip of claim 1 wherein the first hook has at least three first hook serrations, and the tab has at least three tab serrations.

7. The hose clip of claim 1 wherein the flange has a second hook lockingly engageable with the tab to close the hose-receiving space to an inside, second closed condition cross-sectional dimension smaller than the first closed condition cross-sectional dimension.

8. The hose clip of claim 7 wherein the second hook forms an angle with the flange in the range of 20 to 24 degrees.

9. The hose clip of claim 7 wherein the second hook has correspondingly positioned second hook serrations lockingly engageable with the tab serrations.

10. The hose clip of claim 7 wherein the tab further comprises a laterally extending, outwardly projecting rib stop for a locking tool to move the tab into and out of engagement with one of the first hook and the second hook.

11. The hose clip of claim 7 having at least three second hook serrations and at least three tab serrations.

12. A hose clip closeable from an open condition in a free state to a first closed condition and a second closed condition comprising, in combination:
   a flexible, generally tubular, open-ended main body which is circumferentially open-sided to partially define a hose-receiving space having an inside free state cross-sectional dimension;
   attachment means for securing the hose clip to a fixed structure of a motor vehicle;
   a flange extending from one side of the main body and forming a first hook and a second hook;
   and a tab extending from a second side of the main body lockingly engageable with the first hook in the first closed condition, around a hose having a first diameter, free of the second hook, and lockingly engageable with the second hook in the second closed condition, around a hose having a second diameter, free of the first hook;
   wherein the tab has tab serrations, and the first hook has the first hook serrations which lockingly engage the tab serrations when the clip is in the first closed condition.

13. The hose clip of claim 12 wherein pressure on the clip from a hose having a first diameter urges both the tab towards the first hook and the first hook towards the tab.

14. The hose clip of claim 13 further comprising a living hinge enhancing bending of the clip so that in a first closed condition, pressure from the first hose urges the first hook into locking engagement with the tab.

15. The hose clip of claim 12 wherein the second hook has second hook serrations which lockingly engage the tab serrations when the clip is in the second closed position.

16. The hose clip of claim 15 wherein pressure on the clip from a hose having a second diameter urges both the tab towards the second hook and the second hook towards the tab.

17. The hose clip of claim 12 wherein the first hook has 4 serrations, the second hook has 4 serrations, and the tab has 4 serrations.

18. The hose clip of claim 12 wherein the first hook makes an angle with the flange in the range of 20 to 24 degrees, and the second hook makes an angle with the flange in the range of 34 to 38 degrees.

19. The hose clip of claim 12 wherein the attachment means is attached to the motor vehicle by snap fit.

20. A hose assembly comprising, in combination:

a hose;

a clip having a flexible main body which is circumferentially open-sided, defining a hose receiving space having an inside, cross-sectional dimension, wherein the hose is positioned inside the clip and exerts pressure on an interior surface of the clip;

a flexible clip flange extending from the main body of the clip, having a first hook forming a first angle with the clip flange and a second hook forming a second, larger angle with the clip flange;

a living hinge allowing the flange to bend relative the main body of the clip; and a tab extending from the main body;

wherein the pressure on the interior surface of the clip urges the clip flange to bend to enhance locking engagement of the first hook with the tab, the tab has tab serrations, and the first hook has the first hook serrations which lockingly engage the tab serrations when the clip is in the first closed condition.

21. The hose assembly of claim 20 wherein the clip is movable from an open condition to a first closed condition, the hose has a first diameter and the first hook is lockingly engaged with the tab at the first closed condition.

22. The hose assembly of claim 21 wherein the clip is openable from the first closed condition to the open condition for removal of the hose and is closeable to a second closed condition wherein in the second closed condition:

the hose receiving space has an inside cross-sectional dimension smaller than in the first closed condition, and the second hook of the flange releasably engages the tab.

23. The hose assembly of claim 22 wherein the second hook has second hook serrations lockingly engageable with tab serrations on the tab.

24. A vacuum manifold assembly for supplying a source of vacuum to at least a brake booster of a motor vehicle comprising, in combination:

an aspirator for regulating air pressure between an engine port and a brake booster;

a hose assembly comprising a first hose connecting an engine port to the aspirator, a second hose connecting the aspirator to an air inlet source, and a third hose connecting the aspirator to the brake booster; and a first clip movable between an open condition and first and second closed conditions wherein the first clip routs and releasably secures the hose assembly to the motor vehicle, comprising attachment means for securing the clip to the motor vehicle, a flexible main body having an opening sized to receive one of the hoses of the hose assembly, a flange extending from the main body and having a first hook and a second hook, each hook having corresponding serrations, and a tab extending from the main body having serrations engageable with corresponding hook serrations, wherein in the first closed condition at least the main body of the clip bends around one of the hoses of the hose assembly and the pressure of the hose urges locking engagement between the tab serrations and the hook serrations, thereby securing the hose within the opening, and in the second closed condition the second hook serrations are lockingly engageable with the tab serrations.

25. The vacuum manifold assembly of claim 24 further comprising a second clip routing and releasably securing the hose assembly to the motor vehicle.

26. The vacuum manifold assembly of claim 24 further comprising a heat shield positioned around at least a portion of the hose assembly to protect the hose from excessive heat.

27. The vacuum manifold assembly of claim 24 wherein the attachment means secures the clip to the motor vehicle by snap fit.

28. The vacuum manifold assembly of claim 24 wherein the first clip further comprises a living hinge positioned between the main body and the flange, enhancing bending of the main body and the flange so that the tab is lockingly engageable with one of the first hook and the second hook.

* * * * *